United States Patent [19]

Mansfield

[11] Patent Number: 4,872,622
[45] Date of Patent: Oct. 10, 1989

[54] EXTENSION CORD WINDING AND STORAGE APPARATUS

[76] Inventor: Ronald N. Mansfield, 12851 SW. 22nd St., Miami, Fla. 33175

[21] Appl. No.: 256,516

[22] Filed: Oct. 12, 1988

[51] Int. Cl.[4] ...................... B65H 75/36; B65H 75/40
[52] U.S. Cl. .................................... 242/85.1; 242/96; 191/12 R; D8/358
[58] Field of Search ................. 242/85.1, 85, 96, 115, 242/116; 191/12 R; 224/264, 907; D8/358, 359

[56] References Cited

U.S. PATENT DOCUMENTS

| | | | |
|---|---|---|---|
| 2,603,429 | 7/1952 | Jaworowski et al. | 242/85.1 |
| 3,388,876 | 6/1968 | Wilson | 242/96 |
| 3,907,236 | 9/1975 | Sims, Jr. | 242/85.1 |
| 4,177,961 | 12/1979 | Gruenewald | 242/85.1 |
| 4,261,529 | 4/1981 | Sandberg et al. | 242/85.1 |
| 4,586,675 | 5/1986 | Brown | 242/85.1 |
| 4,778,125 | 10/1988 | Hu | 242/85.1 |

*Primary Examiner*—Stuart S. Levy
*Assistant Examiner*—Steven M. duBois
*Attorney, Agent, or Firm*—Henderson & Sturm

[57] ABSTRACT

A cord winding and storage apparatus (10) including a receptacle member (13) having two receptacle segments (14)(15) joined along a common edge (10) and forming an elongated fluted peripheral slit (21) that will accommodate elongated lengths of cords (100) having different diameters; wherein, the receptacle member (13) has an enlarged central opening (17); and, is further equipped with cushion segments (30) that are adapted to frictionally engage the elbow area of a users arm.

5 Claims, 1 Drawing Sheet

EXTENSION CORD WINDING AND STORAGE APPARATUS

TECHNICAL FIELD

This invention relates in general to a device to assist in the winding and storage of elongated extension cords, ropes, or the like, and in particular to an extension cord winding device which may be taken apart to free the wound cord or rope.

BACKGROUND OF THE INVENTION

This invention was the subject matter of Document Disclosure Program No. 189437 which was received in the U.S. Patent and Trademark Office on Mar. 28, 1988.

As can be seen by reference to the following U.S. Pat. Nos. 4,586,675; 4,261,529; 4,177,961 and 3,907,236 the prior art is replete with myriad and diverse constructions designed to assist in the manual winding of rope, electrical cord, or the like.

While all of the prior art constructions are more than adequate for the purpose and function for which they were specifically designed, they do suffer from a number of shared deficiencies.

For instance, all of the prior art devices prohibit the removal of the wound cord as a unit. In general, the cord, once wound, may only be removed loop by loop; and, cannot be removed as a bundle. This situation is unfortunate because each separate extension cord or rope which needs to be wound requires its own separate winder construction.

In addition, the odd structures which comprise most of the prior art devices require awkward and unnatural movement on the part of the user as he winds a rope or extension cord onto the device. None of these constructions simulate the natural hand over elbow movement with which most users are inclined to be familiar.

Obviously, there has been a longstanding need for an extension cord winding and retention device which incorporates the features of economical application and natural coordination; and the provision of such is the stated purpose and function of the present invention.

BRIEF SUMMARY OF THE INVENTION

The apparatus that forms the basis of the present invention involves an extension cord winding and storage device which comprises a storage unit and a padding unit. The storage unit is generally configured to be held by a person and to extend from the elbow to the hand of one arm. The storage unit generally forms an oblong, continuous loop configuration.

The storage unit comprises a two piece hollow-cored receptacle member having a outer peripheral slit which extends completely around the receptacle member. This elongated peripheral slit is dimensioned to readily accept diversely dimensioned electrical extension cords, or the like, through the slit, allowing the elongated cord or cords to pass into the core of the receptacle member.

In addition, the receptacle member slit is deformable in such a way, so that the male plug of an extension cord may be forced through the slit opening into the hollow core area. From this point, the plug may be placed through a special plug accommodating aperture on the inner wall of the receptacle member. By virtue of this arrangement the plug will be held stationary during the initial stages of winding, and will always remain accessible. Thus the extension cord may be readily used even while partially wound on the apparatus.

The retention unit further includes an interlocking securing arrangement which extends around the circumference of the storage unit on its inner surface. This interlocking securing arrangement is generally disposed opposite to the location of the slit opening of the receptacle member.

The interlocking securing arrangement provides a means to split the retention unit into two distinct halves; leaving the lower half of the receptacle member separate from the upper half. When necessary, this separation is generally performed after having wound an extension cord onto the retention unit. As a consequence, once the separation occurs, the cord may be easily removed as a wound bundle. Furthermore, the retention unit may be easily rejoined at the interlocking member and is then ready for further use.

The padding unit comprises a pair of elbow accommodating pad members which are disposed on the inner external surface of the retention unit. These pad members are located at the narrow end of the retention unit, and are designed for an elbow to be interposed between the pads. In this way, the apparatus is comfortably held by a user. In general, each pad member is split down its center so that these pad members will cooperate when the retention unit is split to remove a wound extension cord.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings, wherein.

BEST MODE FOR CARRYING OUT THE INVENTION

Figure 1:
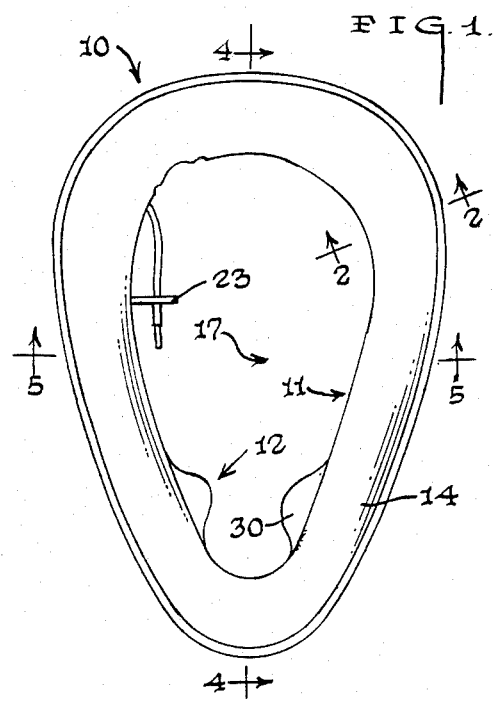
FIG. 1 is a side plan view of the apparatus.

As can be seen by reference to the drawings and in particular to FIG. 1, the apparatus that forms the basis of the present invention involves an extension cord winding and storage apparatus that is designated generally by the reference numeral (10). The apparatus (10) comprises in general: a storage unit (11) and a padding unit (12). These units will now be described in seriatim fashion.

Figure 2:
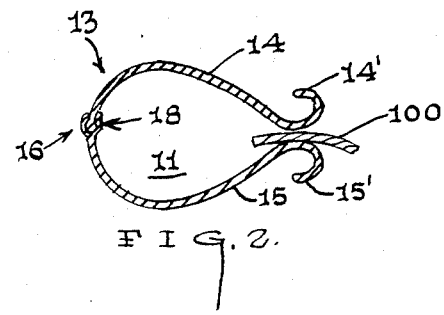
FIG. 2 is a cross-sectional view of the apparatus taken thru line 2—2 of FIG. 1.

As shown in FIGS. 1 and 2, the storage unit (11) comprises in general: a two piece receptacle member (13) which includes two receptacle segments (14) and (15) having a generally S-shaped cross-sectional configuration and which are adapted to be joined along one of their common edges (16) to form a generally oval storage unit (11) having an enlarged generally oval central opening (17) formed therein.

Figure 3:
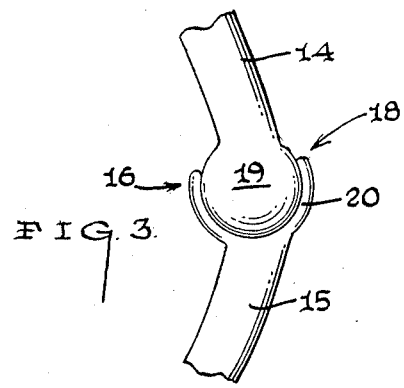
FIG. 3 is an enlarged detailed view of the interlocking members of the apparatus.

As can best be seen by reference to FIGS. 2 and 3, the joined ends of the receptacle segments (14) and (15) are provided with a snap-fit releasable interlocking securing arrangement (18); wherein, one of the receptacle segments (14) is provided with a generally continuous bead element (19); and, the other receptacle segment (15) is provided with a generally continuous channeled groove (20) that is adapted to releasably engage the bead element (19) in a well recognized manner.

Figure 4:
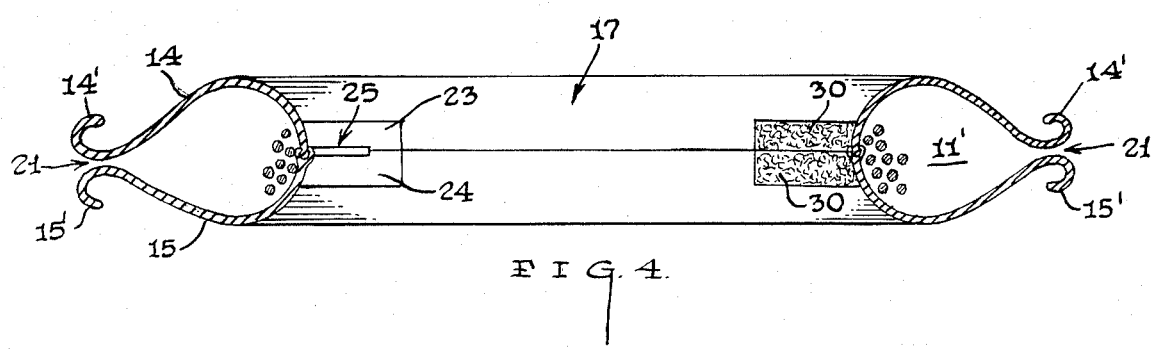
FIG. 4 is a cross-sectional view taken thru line 4—4 of FIG. 1 showing the lower portion of the apparatus; and, FIG. 5 is a cross-sectional view taken thru line 5—5 of FIG. 1 showing the upper portion of the apparatus.
Figure 5:
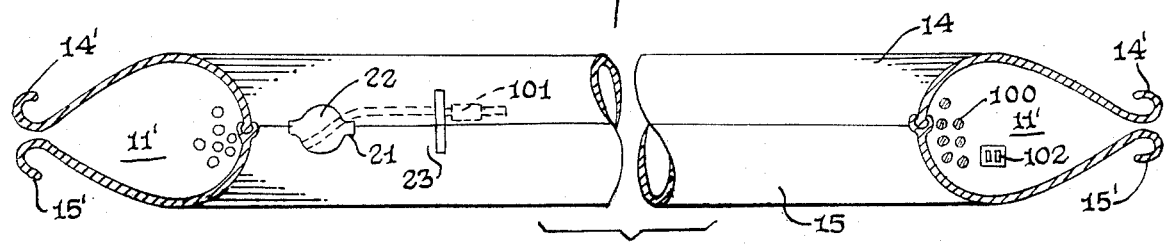

As shown in FIGS. 2, 4, and 5, the free ends of the receptacle segments (14) and (15) are provided with outwardly curved lip elements (14') and (15') which define an elongated fluted peripheral slit (21) which extends completely around the outer periphery of the generally oval storage unit (11).

It should also be appreciated at this juncture that since the receptacle segments (14) and (15) are only attached along their inner common edge (16) the free ends (14') and (15') of the respective receptacle segments (14)(15) are capable of flexure relative to one another to enlarge the slit (21) to accept cords (100) having diverse diameters.

As can best be seen by reference to FIGS. 1, 4, and 5, the storage unit (11) is further provided with a plug outlet aperture (22) and a plug capturing element (23); whereby either the enlarged male (101) or female (102) plug element of an electrical cord (100) or the like can project through the plug outlet aperture (22) while the remainder of the cord (100) is coiled within the storage unit receptacle (11').

As shown in FIGS. 4 and 5, the plug outlet aperture (22) has a generally circular configuration and is further provided with at least one radially disposed groove (22') that is adapted to frictionally engage the sides of the cord (100). In addition, the plug capturing element (23) comprises a split tab member (24) having an elongated stepped slot (25); wherein, at least a portion of the stepped slot (25) will accommodate the diameter of the cord (100) while preventing the passage of either of the plug ends (101)(102) of the cord.

Turning now to FIGS. 1 and 4, it can be seen that the padding unit (12) comprises a plurality of contoured cushion elements (30) disposed in an opposed relationship with one another, on the inner external surface of the storage unit (11) adjacent to the narrower end of the oval central opening (17) of the storage unit (11).

These contoured cushion elements (30) are dimensioned and configured to frictionally grasp the users elbow while the users hand grasps the upper portion of the apparatus (10) in the standard coil wrapping posture that would be assumed by the user in the absence of this invention.

Having thereby described the subject matter of this invention it should be apparent that many substitutions, modifications and variations of the invention are possible in light of the above teachings. It is therefore to be understood that the invention as taught and described herein is only to be limited to the extent of the breadth and scope of the appended claims.

I claim:

1. A cord winding and storage apparatus for use with diverse elongated cords wherein some of the diverse cords are provided with male and female plug elements wherein the cord winding and storage apparatus comprises:

a storage unit including a receptacle member having an enlarged central opening wherein the receptacle member comprises two receptacle segments each having a generally S-shaped cross-sectional configuration wherein the receptacle segments are joined along one common edge to form an enlarged storage unit receptacle and the free ends of the receptacle segments are provided with outwardly curved lip elements which define an elongated relatively narrow fluted peripheral slit which extends completely around the receptacle member and wherein the free ends of the receptacle segments are capable of flexure relative to one another to enlarge the said peripheral slit to accommodate cords having different diameters.

2. The apparatus as in claim 1 wherein the enlarged central opening has a generally oval configuration.

3. The apparatus as in claim 2 wherein the receptacle segments are joined in a releasable snap-fit relationship along their common edge.

4. The apparatus as in claim 3 wherein the receptacle member is further provided with a plug outlet aperature and a plug capturing element.

5. The apparatus as in claim 4 further comprising a padding unit including a plurality of contoured cushion elements dimensioned to frictionally engage the users elbow when the user places their lower arm within the said enlarged central opening.

* * * * *